April 12, 1960 B. EPSZTEIN 2,932,761

TRAVELING WAVE TUBE

Filed May 22, 1957 3 Sheets-Sheet 1

INVENTOR
BERNARD EPSZTEIN
BY Paul M. Craig, Jr
ATTORNEY.

INVENTOR
BERNARD EPSZTEIN
BY Paul M. Craig, Jr.
ATTORNEY.

April 12, 1960

B. EPSZTEIN 2,932,761

TRAVELING WAVE TUBE

Filed May 22, 1957

3 Sheets-Sheet 3

INVENTOR
BERNARD EPSZTEIN
BY Paul M. Craig, Jr.
ATTORNEY.

United States Patent Office 2,932,761
Patented Apr. 12, 1960

2,932,761

TRAVELING WAVE TUBE

Bernard Epsztein, Paris, France, assignor to Compagnie Generale de Telegraphie Sans Fil, Paris, France Application May 22, 1957, Serial No. 660,935
Claims priority, application France May 31, 1956
1 Claim. (Cl. 315—3.6)

The present invention relates to traveling wave tubes, and more particularly relates to a new type of delay line for use in such tubes, especially in the traveling wave amplifier tubes.

Accordingly, it is an object of the present invention to provide a delay line for use with a traveling wave tube which enables operation thereof at the highest frequencies and within a relatively wide band of frequencies.

It is another object of the present invention to provide an amplifier tube equipped with such a delay line.

It is still another object of the present invention to provide a delay line for use with ultra-high-frequency tubes which may be readily manufactured at relatively little cost.

It is a further object of the present invention to provide a delay line for use with a traveling wave tube which permits an increase in the output of the tube.

A still further object of the present invention resides in the provision of a delay line which enables the use of a relatively large laminar electron beam of great intensity to increase the output of the tube.

Another object of the present invention resides in the construction and design of a delay line having two-dimensional delay characteristics.

These and other objects, features and advantages of the present invention will become more obvious from the following description when taken in connection with the accompanying drawing which shows, for purposes of illustration only, several preferred embodiments in accordance with the present invention, and wherein Figure 1 is a cross-sectional view of a traveling wave amplifier tube in accordance with the present invention having crossed electric and magnetic fields and taken along line 1—1 of Figure 2;

In the prior art traveling wave tubes, the output of the tube depends on the area and intensity of the electron beam, i.e., on the effective area of the delay line exposed for interaction with the electron beam traveling adjacent the line. However, in practice the width of the delay line, i.e., the dimension of the line in a direction perpendicular to the direction of the electron flow is limited, for example, for an interdigital delay line or the like, to a fraction of the wave length of the ultra-high-frequency wave, usually approximately to a one-half wave-length. Consequently, the width of the electron beam which may be used is limited by design considerations of the delay line. As the frequencies used with such tubes are pushed ever higher, the use of the prior art delay lines not only offers serious disadvantages in the possible output of the tube but also makes it increasingly difficult to machine a delay line accurately to the minute dimensions required in the millimeter wave band.

The delay line according to the present invention consists essentially of a relatively thin metallic plate in which have been cut out, in any suitable manner, apertures, each of which is provided with a center of symmetry, the centers of symmetry of these apertures being disposed in a checker-like manner, i.e., the centers of symmetry of adjacent apertures being displaced in the lateral and longitudinal directions.

According to a preferred embodiment of the present invention, one of the dimentions of the apertures is of the order of a half-wavelength of the propagation in free space of the ultra-high-frequency wave utilized, whereas the second dimension thereof is smaller and differs depending on the desired characteristics of the line.

According to one particular embodiment of the present invention, the sections of the apertures are diamond or rhombic in shape.

Figures 1, 2:
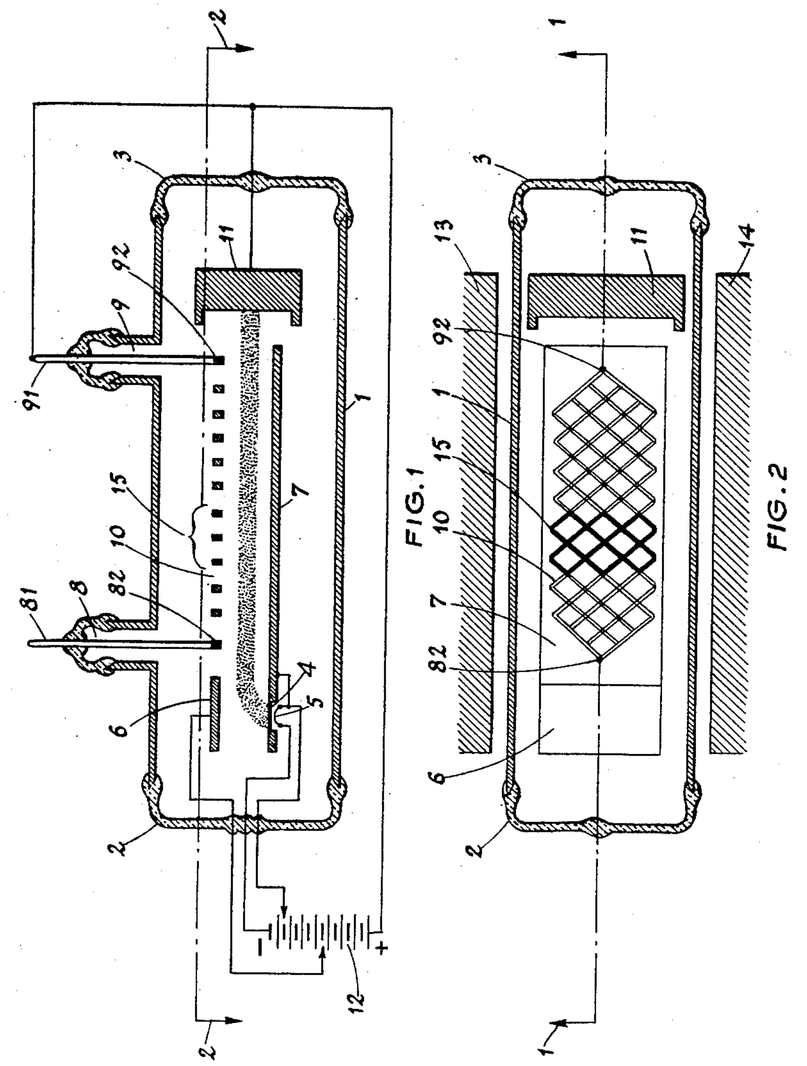
Figure 2 is a cross-sectional view of the traveling wave amplifier tube of Figure 1 taken along line 2—2 of Figure 1.

Referring now to the drawing wherein like reference numerals are used throughout the various views of the drawing to designate like parts, and more particularly to the embodiment of Figures 1 and 2, reference numeral 1 designates a cylindrical metallic envelope. At the interior of the cylindrical metallic envelope 1, which is closed at both ends by two insulating disks 2 and 3 and which is pumped free of air to provide a predetermined vacuum, as is well known, the traveling wave tube includes a cathode 4, a focusing electrode 6 facing the cathode 4, and an electrode 7 commonly referred to as "sole."

The cathode 4 which is located at one end of the sole 7 is at the same potential as the sole 7, and is constituted by a parallelepipedic metallic block whose surface is covered with an emissive layer. The parallelepipedic block of cathode 4 is disposed perpendicular to the longitudinal axis of symmetry of the sole and extends over the entire width thereof. The cathode 4 is heated to emission temperature by a heater filament 5 and emits a laminar electronic beam.

Apertures 8 and 9 are provided in the envelope 1 which enable passage therethrough of an input conductor 81 and of an output conductor 91 respectively for the ultra-high-frequency energy of the amplifier. The conductors 81 and 91 are connected respectively to the two ends of delay line 10, which is disposed essentially parallel to sole 7 and which will be described more fully hereinafter. It is understood that suitable impedance matching devices may also be used with the input and output couplings 81 and 91, if necessary, as well as with corresponding coupling elements of the other embodiments described herein so as to minimize reflections and standing waves.

A collector 11 collects the electrons emitted by cathode 4 after traversal thereof through the interaction space formed between the sole 7 and the delay line 10. A battery 12 or other suitable source of power provides the necessary voltages for the different elements and electrodes of the tube. A magnet, either of the electromagnetic or permanent magnet type, the pole pieces of which are schematically illustrated in Figure 2 and designated therein by reference numerals 13 and 14, provides a transverse magnetic field which is perpendicular to both the direction of propagation of the beam and the electric field established between the sole 7 and the delay line 10.

The tube described hereinabove, as well as the various elements thereof, is well known per se so that a more detailed description is dispensed with herein, the novelty of the present invention residing in the particular construction and arrangement of the delay line 10 with which the tube is provided and in the advantages derived therefrom in the operation of the tube.

The delay line 10, according to the present invention, is constituted by a metallic plate of essentially negligible thickness as compared to the other dimensions thereof. Apertures, for example, in the form of diamonds or rhombs, have been cut into the metallic plate so as to form a grill-like or lattice-like structure the shape of which is clearly visible in Figure 2. An attenuation 15 of suitable well-known material is placed over a portion of the delay line 10 intermediate the two ends thereof in a manner well known in the art of travelling wave amplifier tubes.

Perferably, the length of the largest diagonal of the diamond- or rhombic-shaped apertures is of the order of a half wave length of propagation in free space of the ultra-high-frequency wave used. In that example, the direction of propagation of the electronic beam is parallel to the smallest diagonal of the diamond- or rhombic-shaped apertures. The ends of the line 10 are cut off in the shape of an arrowhead formed by the intersection of two edges of the delay line in a point disposed on the longitudinal axis of symmetry of the line 10, and the input and output conductors 81 and 91 respectively for the ultra-high-frequency are connected to the line at points 82 and 92 thereof, which are disposed at the two ends of the line 10 and coincide with these two points of intersection.

This type of coupling of the line 10 with the input conductor 81 enables an in-phase propagation of the ultra-high-frequency wave at all points of the line which are located on any perpendicular to the longitudinal axis of symmetry thereof.

For a tube of this type, calculations made by applicant and confirmed in practice by tests have indicated that the fundamental space harmonic is direct or forward, and that the delay line has a band-pass of relatively great width in the mode of operation thereof corresponding to this fundamental space harmonic. On the other hand, the dangers of parasitic oscillations by interaction between the electronic beam and a backward or inverse space harmonic of the wave propagated in the line are very much reduced; for the inverse space harmonics have relatively weak amplitudes in the line compared to the fundamental direct harmonic thereof. Nevertheless, if so desired, it is possible to use the delay line according to the present invention in a backward wave oscillator by selecting and using an interaction with a suitable inverse harmonic.

The longitudinal pitch $p$ of the delay line, i.e., the small diagonal of the diamond- or rhombic-shaped apertures, is preferably of the order of:

$$\frac{1}{2}\times\frac{\lambda}{\frac{c}{v}}$$

where $\lambda$ is the wavelength of propagation, and $c/v$ the ratio of delay, $c$ being the speed of light and $v$ the speed of propagation of the phase of the wave in the longitudinal direction. This pitch $p$ is, therefore, smaller than the transverse dimension of the aperture, in the approximate ratio of $c/v$.

The delay line according to the present invention permits the use of a very large laminar electronic beam of great intensity. Moreover, the delay line may be readily attenuated at any desired point by any process well known to a person skilled in the art, for example, by deposition of Kanthal over a portion of the line.

Furthermore, such a delay line may be readily realized and manufactured also for the highest frequencies contemplated at present, and in particular for millimeter waves, for example, by punching out the apertures from a conventional flat strip of sheet metal.

Figure 3:
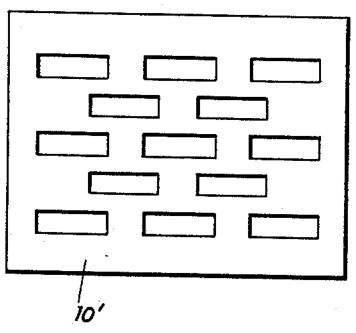
Figure 3 is a plan view of another embodiment of a delay line in accordance with the present invention.
Figure 4:
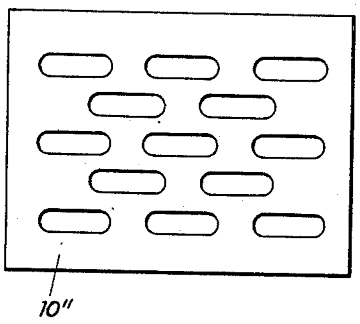
Figure 4 is a plan view similar to Figure 3 of a further embodiment of a delay line in accordance with the present invention.

Figures 3 and 4 illustrate different embodiments of delay lines which may be used in a tube according to the present invention. The delay lines 10′ and 10″ of Figures 3 and 4, respectively, differ from that of Figures 1 and 2 by the form of the apertures thereof, which, in Figure 3, are rectangular in configuration and, in Figure 4, are elongated in the shape of "race-tracks." The centers of symmetry of the apertures of each line 10′ and 10″ are regularly disposed in a checker-like manner as in Figures 1 and 2. As in the case of the delay line of the tube of Figures 1 and 2, the greatest dimension of each of the apertures of the delay lines 10′ and 10″ of Figures 3 and 4, respectively, is of the order of a half wave length of the ultra-high-frequency wave propagated in free space.

All of the delay lines described hereinabove may be readily manufactured by cutting or punching apertures in the starting material of an ordinary metallic plate.

Figure 5:
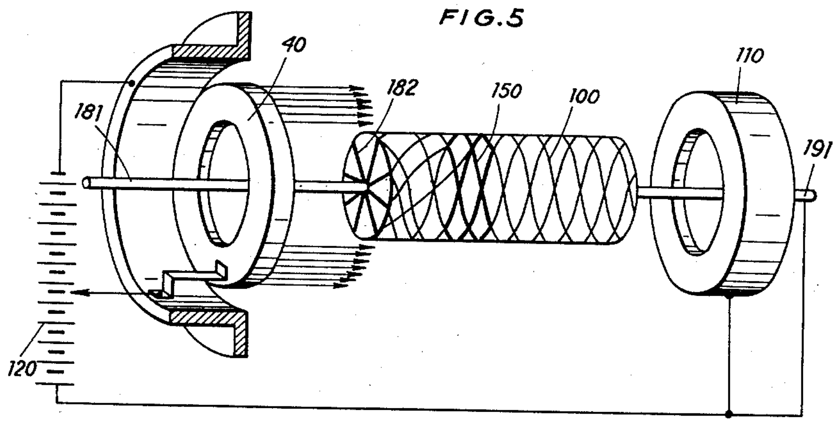
Figure 5 is a schematic perspective view of a traveling wave amplifier tube in accordance with the present invention having an essentially cylindrical structure.

The embodiment according to the present invention schematically illustrated in Figure 5 relates to an amplifier tube of cylindrical structure, without static electric field and without transverse magnetic field; the enclosure of the tube which may be of any suitable well-known construction has not been shown in Figure 5 for the sake of clarity.

The tube according to Figure 5 includes an annular cathode 40, a delay line 100, and an annular collector 110. The delay line 100 is of the same type as delay line 10 of Figures 1 and 2, but rolled about a cylinder having as axis the longitudinal axis of symmetry of the delay line. The annular cathode 40 is coaxial with the delay line 100, and is so constructed as to emit a laminar electronic beam of tubular configuration which passes over the outside of the delay line 100 and surrounds the grill-like structure of the delay line along the entire length thereof in interacting relationship therewith. An attenuation 150 is again disposed over a portion of the delay line intermediate the two ends thereof. As in the tube of Figures 1 and 2, the direction of the electronic beam is essentially parallel to the small diagonal of the diamond- or rhombic-shaped apertures provided in the delay line 100.

Axial conductors 181 and 191 serve to feed or lead-in and extract or lead-out the ultra-high-frequency energy into and from the delay line 100 respectively. The axial conductors 181 and 191 are connected to the periphery of the delay line 100 by a predetermined number of spoke-like radial conductors of which only the radial conductors 182 on the input side of the line 100 are shown in the drawing while analogous radial conductors (not shown) are also provided at the output side of the line 100 so as to provide a co-phasal input and output connection with the peaks or summits of all exposed diamond- or rhombic-shaped portions of the delay line 100.

Since the delay lines described hereinabove have a periodic structure in two directions intersecting one another, as is obvious from an inspection of these delay lines and from a consideration of the two-dimensional pattern of the lines for the centers of symmetry, such delay lines may also be used with and applied to any tubes, either amplifier or oscillator, in which the two-dimensional delay characteristics are used. As non-limitative example of such use, Figures 6 and 7 illustrate this application to the case of an oscillator tube with two cross beams, i.e., with two beams propagating in two directions intersecting one another, the principle of operation of which has been more fully described in the copending application, Serial No. 558,448, by Georges Mourier, filed on January 11, 1956, and entitled "Double Beam Electron Discharge Tube."

Figure 6:
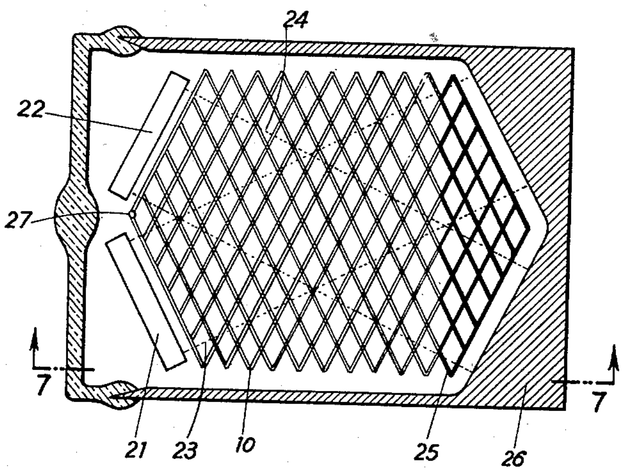
Figure 6 is a cross-sectional view of a backward wave oscillator with two crossed beams and provided with a delay line according to the present invention, taken along line 6—6 of Figure 7.

Figure 6 is a plan cross-sectional view of such a two-dimensional oscillator tube which, analogous to Figure 2, has a delay line 10 with an essentially arrowhead-shaped or pointed configuration at each end thereof formed by two edges or sides of the delay line intersecting in a point located essentially on the longitudinal axis of symmetry thereof. Two electron guns 21 and 22 of conventional construction are disposed along the sides or edges of the arrowhead-shaped ends of the delay line 10 essentially parallel thereto. The electron guns 21 and 22 emit mutually crossed or intersecting beams of electrons 23 and 24, respectively, which propagate on either side of the delay line from one end thereof to the other, the approximate width of each of the beams being indicated by dotted lines in Figure 6. The electrons in the two beams 23 and 24 are collected by means of an arrowhead-shaped collector 26 disposed essentially parallel to the terminal edges of the delay line. The oscillators of this type of construction start to operate or are set off and stabilize themselves on a given frequency according to the mechanism and functioning explained in the aforementioned copending application which is incorporated herein by reference and to which reference may be had, if necessary, for a complete understanding of such operation.

Figure 7:
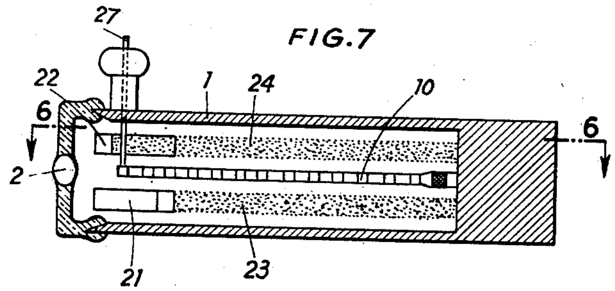
Figure 7 is a cross-sectional view of the backward wave oscillator illustrated in Figure 6 and taken along line 7—7 thereof.

The oscillator illustrated in Figures 6 and 7 functions with a backward or inverse wave, and in conformity with such functioning, the attenuation 25 is disposed at the end of the delay line 10 adjacent the collector 26 whereas the output 27 is coupled to the end of the delay line 10 adjacent the source of electrons. The other elements and arrangements thereof are the same as in connection with Figures 1 and 2. Since the oscillator described therein is of the O-type, it does not require a so-called "sole" electrode, and the only supply of electric power which must be applied to the tube, is the appropriate positive voltage applied to the delay line 10, to the collector 26 and the accelerating anode of the guns 21 and 22 with respect to the cathodes as well as the heater filament voltages, all of which may be accomplished from any suitable source of power and lead-in connections (not shown).

It is also understood that the delay lines 10′ and 10″ of Figures 3 and 4 may be used with an oscillator tube as described in connection with Figures 6 and 7 as well as with an amplifier tube of Figure 5.

While I have shown and described several embodiments in accordance with the present invention, it is understood that the same is not limited thereto but is susceptible of many changes and modifications within the spirit of the present invention, and I intend to cover all such changes and modifications as encompassed by the appended claim.

I claim:

An electron discharge device adapted to operate as a backward wave oscillator comprising a delay line in the form of flat metallic plate provided with a plurality of apertures having a pair of edges intersecting in a point located on the longitudinal symmetry axis of said plate, adjacent apertures being displaced in the lateral and longitudinal directions according to a predetermined pattern to provide a two-dimensional periodic structure, two cathode means positioned essentially parallelly with respect to said edges of said delay line to propagate each a ribbon-like electron beam parallel to said plate, said beams being respectively propagated on either side of said plate and being mutually crossed, collector means positioned with respect to said delay line to collect said crossed beams, attenuation means on a part of said plate near said collecting means, and output means coupled to said point of said plate.

References Cited in the file of this patent

UNITED STATES PATENTS

| | | |
|---|---|---|
| 2,684,453 | Hansell | July 20, 1954 |
| 2,708,236 | Pierce | May 10, 1955 |
| 2,774,005 | Kazan | Dec. 11, 1956 |
| 2,786,959 | Warnecke et al. | Mar. 26, 1957 |
| 2,849,643 | Mourier | Aug. 26, 1958 |

FOREIGN PATENTS

| | | |
|---|---|---|
| 668,017 | Great Britain | Mar. 12, 1952 |
| 699,893 | Great Britain | Nov. 18, 1953 |